(12) United States Patent
Ryter

(10) Patent No.: US 7,733,991 B2
(45) Date of Patent: Jun. 8, 2010

(54) APPARATUS FOR DETERMINING A FREQUENCY OFFSET ERROR AND RECEIVER BASED THEREON

(75) Inventor: Roland Egon Ryter, Birmensdorf (CH)

(73) Assignee: ST-Ericsson SA, Plan-les-Ouates (CH)

( * ) Notice: Subject to any disclaimer, the term of this patent is extended or adjusted under 35 U.S.C. 154(b) by 986 days.

(21) Appl. No.: 10/577,978

(22) PCT Filed: Oct. 29, 2004

(86) PCT No.: PCT/IB2004/003562

§ 371 (c)(1),
(2), (4) Date: May 1, 2006

(87) PCT Pub. No.: WO2005/043852

PCT Pub. Date: May 12, 2005

(65) Prior Publication Data

US 2007/0041479 A1 Feb. 22, 2007

(30) Foreign Application Priority Data

Nov. 3, 2003 (EP) .................................. 03300192

(51) Int. Cl.
*H03D 1/00* (2006.01)
*H04L 27/06* (2006.01)
(52) U.S. Cl. .................. 375/343; 375/362; 375/272; 375/334; 375/344; 375/326; 455/318
(58) Field of Classification Search .................. 375/343, 375/365, 362, 272, 344, 334, 326, 327; 455/318; 331/1 R
See application file for complete search history.

(56) References Cited

U.S. PATENT DOCUMENTS

| 4,888,744 | A | * | 12/1989 | Keeler | 367/90 |
| 5,894,593 | A | * | 4/1999 | Cadd | 455/254 |
| 6,356,608 | B1 | * | 3/2002 | Atarius | 375/362 |
| 6,642,797 | B1 | * | 11/2003 | Luo et al. | 331/1 R |
| 6,657,986 | B1 | * | 12/2003 | Laudel et al. | 370/342 |
| 6,671,379 | B2 | * | 12/2003 | Nemirovski | 381/93 |

(Continued)

FOREIGN PATENT DOCUMENTS

EP 1217781 A1 6/2002

(Continued)

OTHER PUBLICATIONS

International Search Report corresponding to International Patent Application No. PCT/IB2004/003562, filed Oct. 29, 2004, 3 pages.

*Primary Examiner*—Phuong Phu
(74) *Attorney, Agent, or Firm*—Eric M. Ringer; Seed IP Law Group PLLC

(57) ABSTRACT

The apparatus (20) for determining a frequency offset error comprises an input (24.1) for receiving a digitally coded frequency demodulated signal (demod Ip2). The frequency demodulated signal (demod Ip2) is processed by digital means (35) for performing a correlation, and by digital means (36) for performing a minimum-maximum evaluation. In order to determine whether a conflation criterion and a minimum-maximum criterion are fulfilled, the apparatus (20) comprises digital processing means (38) to calculate the current offset of the frequency demodulated signal (demod Ip2) and to cancel the current offset if both criteria are fulfilled.

41 Claims, 13 Drawing Sheets

U.S. PATENT DOCUMENTS

| | | | |
|---|---|---|---|
| 6,891,905 B1 * | 5/2005 | Malone et al. | 375/334 |
| 6,934,524 B2 * | 8/2005 | Hansen et al. | 455/318 |
| 2003/0043937 A1 | 3/2003 | Kobayashi et al. | |
| 2003/0043947 A1 * | 3/2003 | Zehavi et al. | 375/365 |

FOREIGN PATENT DOCUMENTS

| | | |
|---|---|---|
| WO | 0126260 A1 | 4/2001 |
| WO | 02082757 A1 | 10/2002 |

* cited by examiner

APPARATUS FOR DETERMINING A FREQUENCY OFFSET ERROR AND RECEIVER BASED THEREON

FIELD OF THE INVENTION

The present invention relates to apparatus and receivers based thereon, for determining in a communication system using frequency modulation schemes (such as, for example, Gaussian Frequency Shift Keying, GFSK) a frequency offset error in a modulated received signal. In particular, the present invention applies to Bluetooth receivers.

BACKGROUND OF THE INVENTION

Many receivers require detection means that enable the receiver to detect a preamble or certain delimiters. This is of particular importance in communication systems where the transmitter and receiver operate in an asynchronous mode. Since the receiver does not know when to expect a signal with payload (herein also referred to as signal burst), the payload is typically preceded by a preamble or start delimiter that is detectable by the receiver.

Especially Bluetooth communication systems, where the preamble phase is very short (only 4 bits), require at the beginning of the signal burst a very fast settling procedure for the receiver. In Bluetooth applications, information is transmitted in the form of packets. A Bluetooth packet has an access code with a four bit preamble, a 64 bit "sync word", a four bit trailer. This access code precedes the random payload data (plus header). The "sync word" is unique to the wireless connection that involves the receiving device. That is, a receiving device understands whether or not a packet received at its antenna is being sent to the receiving device (or another receiving device) by correlating (via a correlation circuit within the receiver's downstream processing circuitry) the sync word against the connection's unique word.

The received signal usually shows some frequency offset that makes it difficult for the receiver to reliably demodulate the package including the sync word. This implies that in some microseconds the frequency offset should be at least roughly removed prior to the sync word and at the same time the edges of the symbol clock signal should be roughly settled close to the middle of the received symbols.

In order to remove quickly the frequency offset in a Bluetooth GFSK modulated antenna signal, usually a MaxMin DC extraction circuit is implemented. In addition to this MaxMin detection, typically a leakage mechanism is employed to reduce the effect of the noise.

Known preamble detection schemes, such as the MaxMin detection scheme as used in conventional analog Bluetooth demodulators, are not very well suited for a digital implementation. Some kinds of preamble detection schemes require that the receiver is provided with a special triggering signal that indicates the signal burst. The respective receiver architectures are complicated.

It is important that the preceding noise does not degrade the required preamble settling process. The MaxMin algorithm, as used in prior art Bluetooth receivers, usually fails due to the preceding noise. Failing means here, that the package error rate (PER) is too high. If there are too many bit errors in the access code, then the received package is rejected which is considered to be a package error.

The location of the searched preamble sequence (e.g., "1010") is especially aggravated by a low S/N ratio, if one assumes a low antenna input signal being received. In this case, the noise of the receiver front-end degrades the wanted signal.

It is a further disadvantage of known Bluetooth approaches based on the MaxMin algorithm, that the compensation may depend on potential wrong historical values. Due to this, the frequency demodulated signal after activating a conventional Bluetooth receiver, but prior to the signal burst, would generate a wrong initial value for the MaxMin algorithm and even the use of the known leakage concept either slows down the offset calculation or reduces dramatically the accuracy.

It is an object of the present invention to provide an improved apparatus that allows to quickly and reliably detect a preamble used, for example, in an FSK or DFSK communication and to estimate and/or remove the offset.

It is another object of the present invention to provide an improved receiver comprising such an improved apparatus.

SUMMARY OF THE INVENTION

These and other objects are accomplished by an apparatus according to claim 1 and a receiver according to claim 13. Further advantageous implementations of the apparatus are claimed in claims 2-12. Further advantageous implementations of the receiver are claimed in claims 14 and 15.

The invention proposed herein allows determining a rough offset in a very short time period. According to the present invention, this is achieved using a frequency demodulated signal without the accurate knowledge of the beginning of the signal burst. As an example, the frequency demodulated signal is derived from an FSK or GFSK-modulated signal (herein referred to as antenna signal) received via a communication channel. Other frequency modulation schemes can be used as well.

According to the present invention, a simplified receiver architecture may be employed using comparators instead of analog-to-digital converts (ADCs) in order to convert the so-called analog I and Q signals to the digital domain. The simplified receiver architecture extracts only the frequency information ($\omega_0(t)$) from the I and Q signals. The signal that carries or represents the frequency information is herein referred to as frequency demodulated signal.

Since the simplified receiver extracts only the frequency information, a triggering signal indicating the start of the signal burst is not available. Due to the fact that the exact timing of the beginning of the signal burst is not known, the receiver has to be activated a certain time (several microseconds) prior to the signal burst and the receiver back-end part needs a special approach to determine the frequency offset error in the short preamble phase.

The proposed digital apparatus for the fast offset compensation is based on a correlator. If in the antenna signal a sequence of "1010", corresponding to the preamble phase, occurs, then a digital frequency offset value is immediately calculated and subtracted from the digital frequency demodulated signal. As mentioned above, the location of the preamble sequence looked for is especially aggravated by a low S/N ratio. The digital apparatus, according to the present invention, is able to operate even under such adverse conditions.

According to the present invention, two criteria have to be fulfilled. Firstly, the correlation with a time-limited (the time-window corresponds to 2 cycles=4 μsec) sine wave signal of 500 kHz has to exceed a certain limit and secondly, the expected peaks of the positive and negative half-waves have to have certain distances. Every time the proposed digital apparatus detects the corresponding preamble sequence, the offset error is newly calculated and subtracted. In contrast to the known MaxMin algorithm, the compensation is not anymore dependent of potential wrong historical values. A conventional Bluetooth receiver would thus generate a wrong initial value for the MaxMin algorithm.

BRIEF DESCRIPTION OF THE DRAWINGS

The present invention will now be described in more detail, by way of example, with reference to the accompanying drawings, wherein.

DESCRIPTION OF PREFERRED EMBODIMENTS

Figure 1:
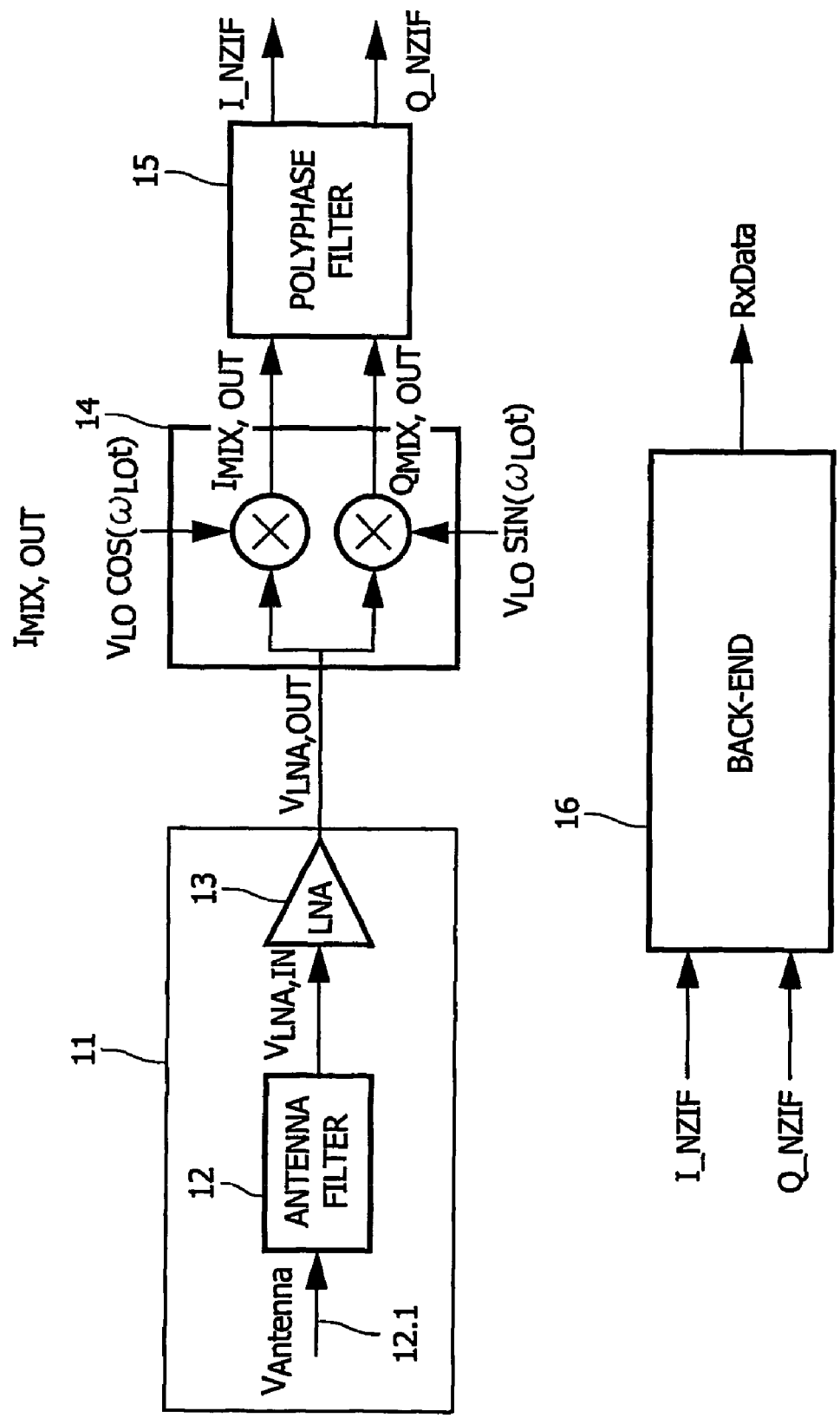
FIG. 1 is a schematic representation of a GFSK receiver front-end and back-end.

A Bluetooth radio receiver 10, according to the present invention, being designed for GFSK demodulation is described in connection with FIGS. 1 and 2. A respective Bluetooth receiver 10, as depicted in FIG. 1, typically comprises an analog front-end part 11 with an antenna filter 12 and a low-noise amplifier (LNA) 13. A quadrature mixer 14 for direct conversion from RF to LIF (Low Intermediate Frequency, here IF=1 MHz) follows right after the low-noise amplifier 13. The baseband I and Q signals ($I_{MIX, OUT}$ and $Q_{MIX, OUT}$) at the outputs of the quadrature mixer 14 are fed to a polyphase filter 15 and the outputs I_NZIF and Q_NZIF of the polyphase filter 15 are connected to a receiver back-end block 16. The receiver 10 is analogue from the front-end part 11 through to the comparators 17. The back-end block 16 is, from the comparators 17 on, digital. The antenna signal $V_{Antenna}$ at the input 12.1 of the antenna filter 12 may be a 2.5 GHz signal, for example. The baseband I and Q signals ($I_{MIX, OUT}$ and $Q_{MIX, OUT}$) at the outputs of the quadrature mixer 14 may have an average frequency of about 1 MHz.

Figure 2:
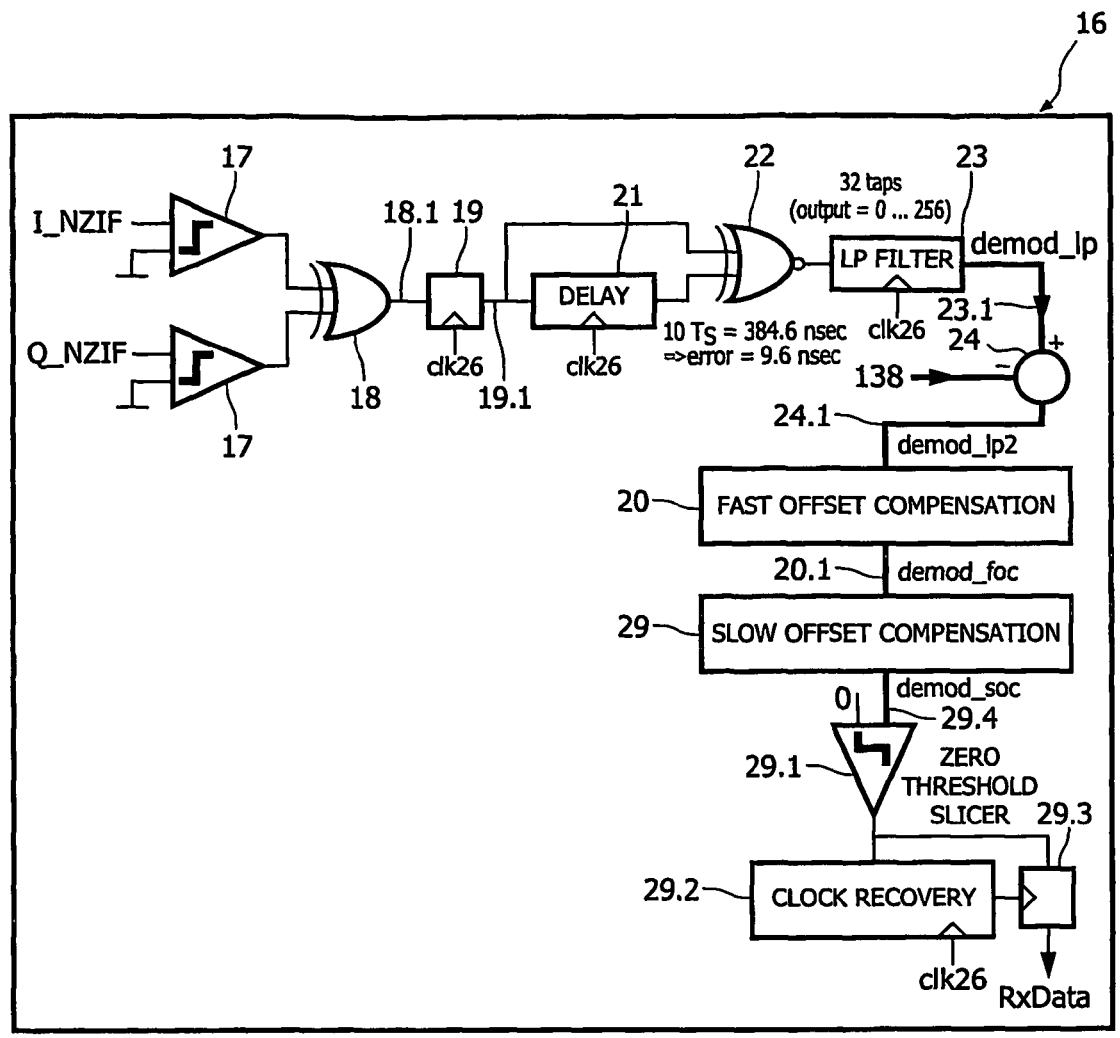
FIG. 2 is a schematic representation of a GFSK receiver back-end, according to the present invention.

The back-end block 16 of the receiver 10 (also referred to as demodulator) is depicted in FIG. 2. It comprises two comparators 17 serving as limiters. Each of the comparators 17 has a differential input. These two comparators 17 determine in which quadrant of the complex plane the actual signals I_NZIF and Q_NZIF (with x(t)=I_NZIF(t)+j Q_NZIF(t)) are. This is done by comparing each of the signals I_NZIF and Q_NZIF with zero. Each transition from one quadrant to the next generates an edge of the output signals (referred to as limited I_NZIF and Q_NZIF signals) at the input side of the X-OR gate 18. The X-OR gate 18 recombines the limited I_NZIF and Q_NZIF signals. The combined signal at the gate's output 18.1 is synchronized with a clock signal clk26 by a flip-flop 19. In the present example, a 26 MHz signal (clk26) is used as clock signal to synchronize the combined signal with 26 MHz. A shift register 21 serves as delay block. It provides for a delay of the combined and synchronized signal at the flip-flop output 19.1 of 10 times Ts. Another X-OR gate 22 with inverted output is employed in order to multiply a delayed signal from the combined and synchronized signal at the output 19.1 of the flip-flop 19. This is done in order to extract from the combined and synchronized signal the frequency information. A low-pass filter 23 (LP) is employed in order to average the output signal of the X-OR gate 22. A finite impulse response (FIR) filter may serve as low-pass filter 23. The filter 23 may have 32 taps, for example. It is also possible to employ a filter with 64 taps.

At the output bus 23.1 of the low-pass filter 23, a digital signal demod_lp is provided that represents the frequency information. In the present example, the bus 23.1 is 9 bits wide (9 bit resolution). An adder 24 is employed in order to subtract a digital value 138 (corresponding to IF=1000 KHz) from the signal demod_lp. This allows the center frequency to be set to zero. At the adder's output bus 24.1 a digitally coded frequency demodulated signal demod_lp2 is made available. This frequency demodulated signal demod_lp2 is fed into the fast offset compensation block 20, that embodies the core of the invention.

The back-end block 16 may further comprise a slow offset compensation block 29 to reduce any residual offset followed by a comparator 29.1 serving as zero threshold slicer and a clock recovery unit 29.2 that extracts the bit clock from the signal demod soc, provided at the output 29.4 of the slow offset compensation block 29. A flip-flop 29.3 is employed to provide the bits (access code, header, and payload) representing the information that was transmitted. The bits output by the flip-flop 29.3 are referred to as RxData.

The back-end block 16 extracts the data bits (or symbols) from the baseband I and Q signals I_NZIF and Q_NZIF. In order to get enough zero-crossings in the I_NZIF and Q_NZIF signals, a LIF architecture is applied. An intermediate frequency of e.g. 0 would result in much less zero-crossings and therefore the limiter concept based on comparators 17 would not be anymore applicable. In terms of process spread and sensitivity there is a large advantage to former architectures: after the I and Q comparators 17, the whole back end circuitry is purely digital.

The drawback of the concept of using simple comparators 17 for the baseband I_NZIF and Q_NZIF signals is the reduction of the available information. Since the amplitude information of the antenna signal $V_{Antenna}$ is not anymore available after the comparators 17, especially the beginning of the burst signal with the preamble code is quite tricky to locate correctly.

Figure 3A:
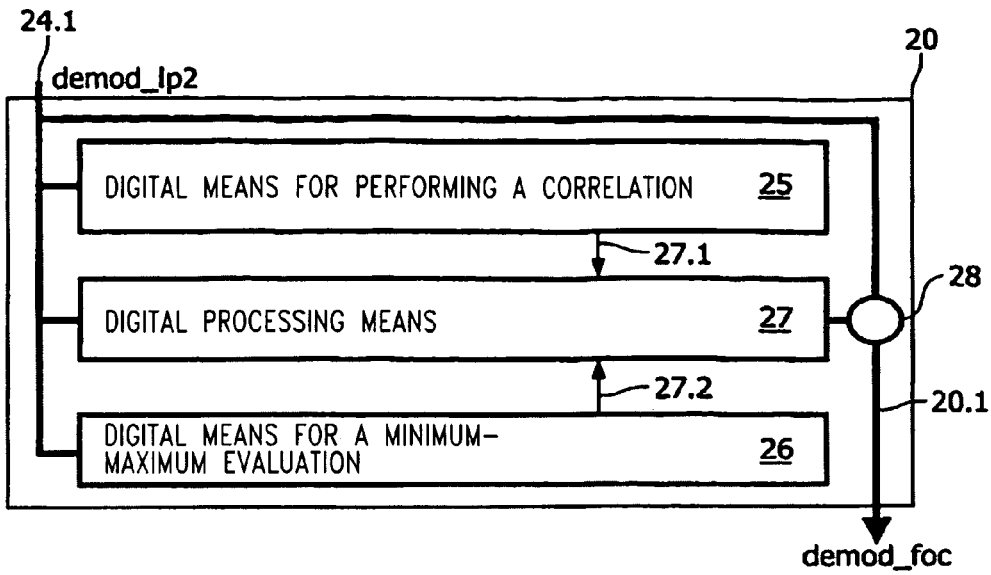
FIG. 3A is a schematic representation of a first fast offset compensation unit, according to the present invention.

Details of a first embodiment of the fast offset compensation block 20 are depicted in FIG. 3A. The apparatus 20 allows to determine a frequency offset error of the digitally coded frequency demodulated signal demod_lp2 and to cancel this error. The fast offset compensation block 20 comprises an input 24.1 for receiving the frequency demodulated signal demod_lp2. This signal is processed by digital means 25 for performing a correlation, and by digital means 26 for a minimum-maximum evaluation. In order to determine whether the frequency demodulated signal demod_lp2 satisfies a correlation criterion and a minimum-maximum criterion at the same time, the apparatus 20 further comprises digital processing means 27, 28. These digital processing means 27, 28 calculate the current offset of the frequency demodulated signal demod_lp2 and cancel the current offset if both criteria are fulfilled. The offset is canceled only if the correlation criterion and the minimum-maximum criterion at the same time. For this purpose an ok_crit1 signal and an ok_crit2 signal are fed to the digital processing means 27 via connections 27.1 and 27.2, respectively. An output signal demod_foc with reduced or cancelled frequency offset is provided at an output bus 20.1.

Figure 3B:
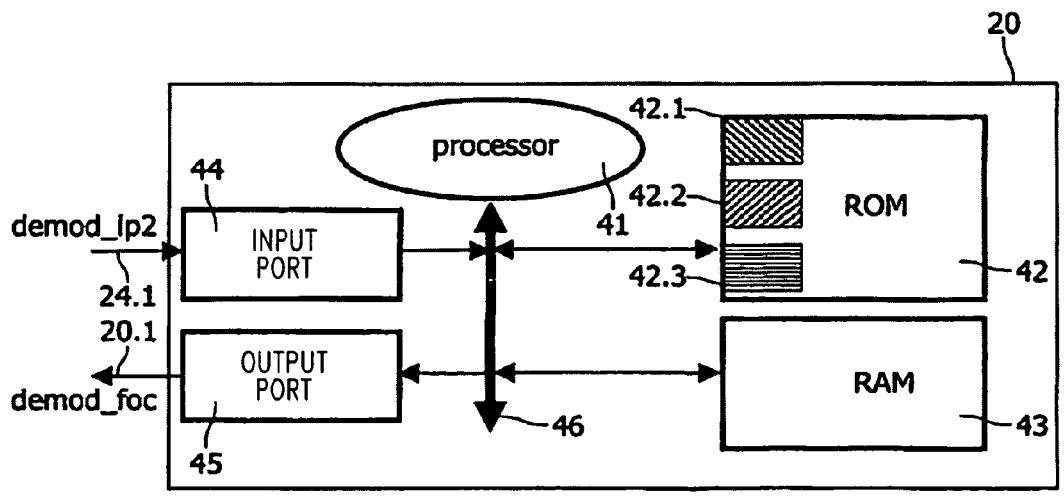
FIG. 3B is a schematic representation of a second fast offset compensation unit, according to the present invention.

Details of a second embodiment of the fast offset compensation block 20 are depicted in FIG. 3B. As schematically illustrated in FIG. 3B, the fast offset compensation block 20 may also be implemented by means of a micro processor 41 with associated ROM 42, RAM 43, bus 46, parallel input port 44 and parallel output port 45. The fast offset compensation functionality is controlled by program code stored in the ROM 42, as schematically indicated by the code blocks 42.1, 42.2, and 42.3. The code block 42.1 when executed by the processor 41 causes the correlation criterion to be applied and the code block 42.2 when executed by the processor 41 causes the minimum-maximum criterion to be applied. If both criteria are fulfilled, the code block 42.3 causes the processor 41 to determine the current offset and to cancel it. The output signal demod_foc with reduced frequency offset is provided at an output 20.1.

Figure 4:
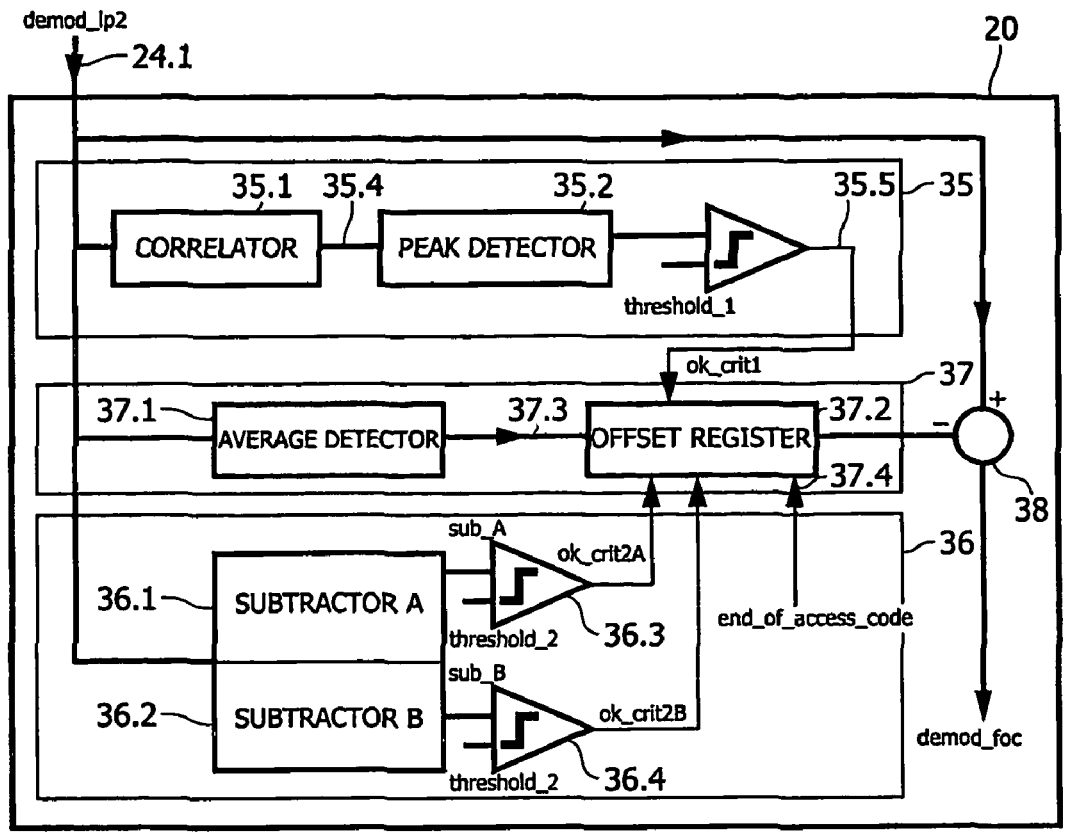
FIG. 4 is a schematic representation of a third fast offset compensation unit, according to the present invention.

Further details of third embodiment are depicted in FIG. 4. FIG. 4 shows possible implementation details of an apparatus 20. The apparatus 20 comprises digital means 35 for performing a correlation. These means 35 comprise a correlator 35.1, a peak detector 35.2, and a comparator 35.3. The correlator 35.1 is continuously running and is being fed with the demodulated signal demod_lp2 (cf. FIG. 11) available as a digital coded signal, where fs=26 MHz corresponds to 26 samples per bit/symbol (note that in the present example Tbit=26 Ts). The amplitude resolution of the demodulated signal demod_lp2 is 9 bits. The correlation is achieved by multiplying the demodulated signal demod_lp2 with a time-limited (the time-window corresponds to 2 cycles=4 µsec) sine wave signal of 500 kHz and integrated over 4 times Tbit. The resulting product of the multiplication is integrated over 4 sec (the duration of the preamble phase) providing the correlation value (cf. FIG. 12, solid line). The correlation output is provided at an output line 35.4. The peak detector 35.3 with subsequent comparator 35.3 is employed in order to identify potential "1010" sequences, all peaks of the continuously running correlation output at the output line 35.4 exceeding a certain value (threshold 1) are detected (cf. FIG. 12, where dashed vertical lines show all the points in time where the comparator output signal ok_crit1 is a logic "1"). The output signal ok_crit1 at the output 35.5 of the comparator 35.3 is an input control signal for the offset memory 37.2 and indicates that the first criterion for a sequence "1010" is fulfilled. The output signal ok_crit1 becomes logic "1" or logic "0", depending on the implementation, if the peaks at the comparator input exceed the threshold 1. If the peaks at the comparator input do not exceed the threshold 1, they are not deemed to be a potential candidate for the detection of the preamble.

The apparatus 20 (cf. FIG. 4) comprises a (sliding) average detector 37.1 that continuously generates a mean value of the demodulated signal demod_lp2 using the same time-window as the correlator 35.1, namely 4 µsec. The mean value is provided at an output 37.3. If the rolling or sliding time-window contains a "1010" sequence (i.e., the first and the second criterion are fulfilled), then the average corresponds to the offset error plus the average of the noise in this time-window. The higher the noise, the lower the accuracy of the determined offset.

There are subtractors A and B, 36.1, 36.2, with subsequent comparators 36.3, 36.4.

As already mentioned in the introduction, the correlation only is not sufficient for a reliable detection of "1010" sequences. The correlator 35.1 together with the peak detector 35.2 and the comparator 35.3 sometimes provides an o.k. signal (ok_crit1) for non "1010" sequences. For example, a sequence of "1110" with larger signal swings than the searched sequence could result in a large correlation value even with the second symbol=1 and therefore may lead to a wrong interpretation (cf. FIG. 13, dashed horizontal lines).

In order to sort out this kind of "wrong" detections, a second criterion was chosen by calculating two subtractions in order to compare all four received symbols (in the correlation time-window) with the corresponding amplitudes. One possible implementation is shown in the FIG. 5. If the differences sub_A and sub_B exceed a certain value, referred to as threshold_2, the comparators 36.3, 36.4 generate two additional o.k. signals, designated as ok_crit2A and ok_crit2B. These two additional o.k. signals are also applied to the offset register 37.2, as indicated in FIG. 4. The comparators 36.3, 36.4 can be tuned by adjusting the threshold_2.

The offset register 37.2 is initialized with zero and is always, that is during the preburst and access code phase, up-dated with the value coming from the average detector 37.1 in the case where all the criteria are fulfilled (correlation and certain distances between the positive and negative waves). The up-date procedure of the offset results in total loosing of the former value and has the advantage to get immediately rid of the wrong value calculated during the preburst phase. This value is a random number reflecting the received noise (cf. FIG. 14 with the up-dated offset value) and has nothing to do with the frequency offset error. After activating the control signal coming from a baseband part of the receiver 10 and indicating the end of the access code (end_of_access_code) the value in the offset register 37.2 is frozen up to the end of the signal burst. The end_of_access_code may be applied to an input 37.4 of the offset register 37.2. The offset register 37.2 is a register and the mean value provided at the output 37.3 is shifted into this register at once.

An offset compensator 38 is employed in order to continuously subtract the value stored in the offset register 37.2 from the demodulated signal demod_lp2. The result, referred to as signal demod_foc, is released from large frequency offset errors. The signal demod_foc still comprises some noise. This residual small error may be reduced in a subsequent slow offset compensation block 29, as indicated in FIG. 2.

Figure 5:
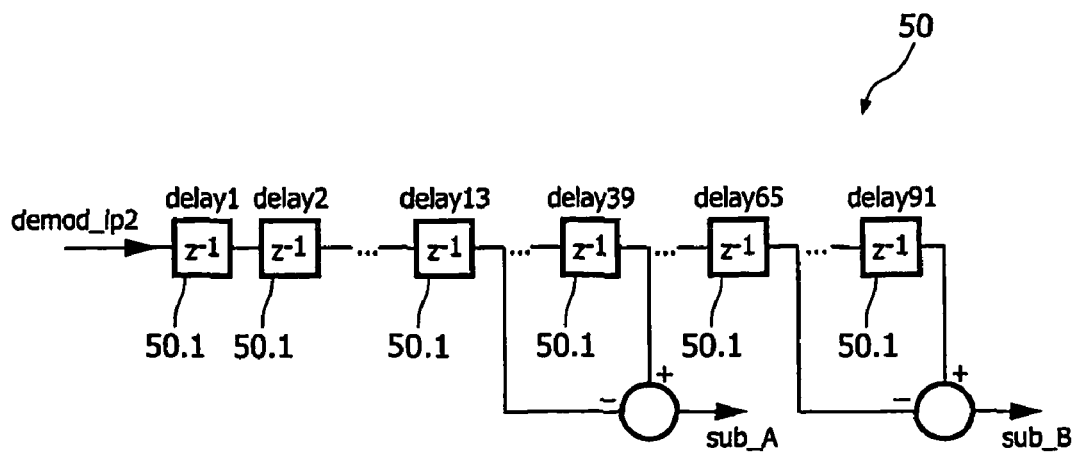
FIG. 5 is a schematic representation of one possible implementation of the subtractors A and B of FIG. 4, according to the present invention.

One possible implementation on gate level with flip-flops of a subtractor 50 A and B is shown in FIG. 5. The subtractor

50 may comprise a series of delay units 50.1 The input signal demod_lp2 is delayed step-by-step. The output signal sub_A is provided by subtracting one of the delayed signals from a later signal. The output signal sub_B is provided by subtracting another one of the delayed signals from yet another signal.

The building blocks of the apparatus 20 may be realized using dedicated locig, or they may be realized using micro processors or digital signal processors (DSPs), as described in connection with FIGS. 3A, 3B and 4. It is, however, a disadvantage of the micro processor or DSP implementation that they consume more power and area than the logic-based implementations.

The digital means 26 or 36 for a minimum-maximum evaluation determine whether the distance between a first minimum and maximum pair is larger than the threshold_2 value. If the distance between a second minimum and maximum pair is larger than the threshold_2 value, too, the second criterion (referred to as minimum-maximum criterion) is satisfied.

Only if the minimum-maximum criterion and the correlation criterion are both o.k., a valid preamble was detected and the frequency offset is calculated and subtracted.

Figure 6:
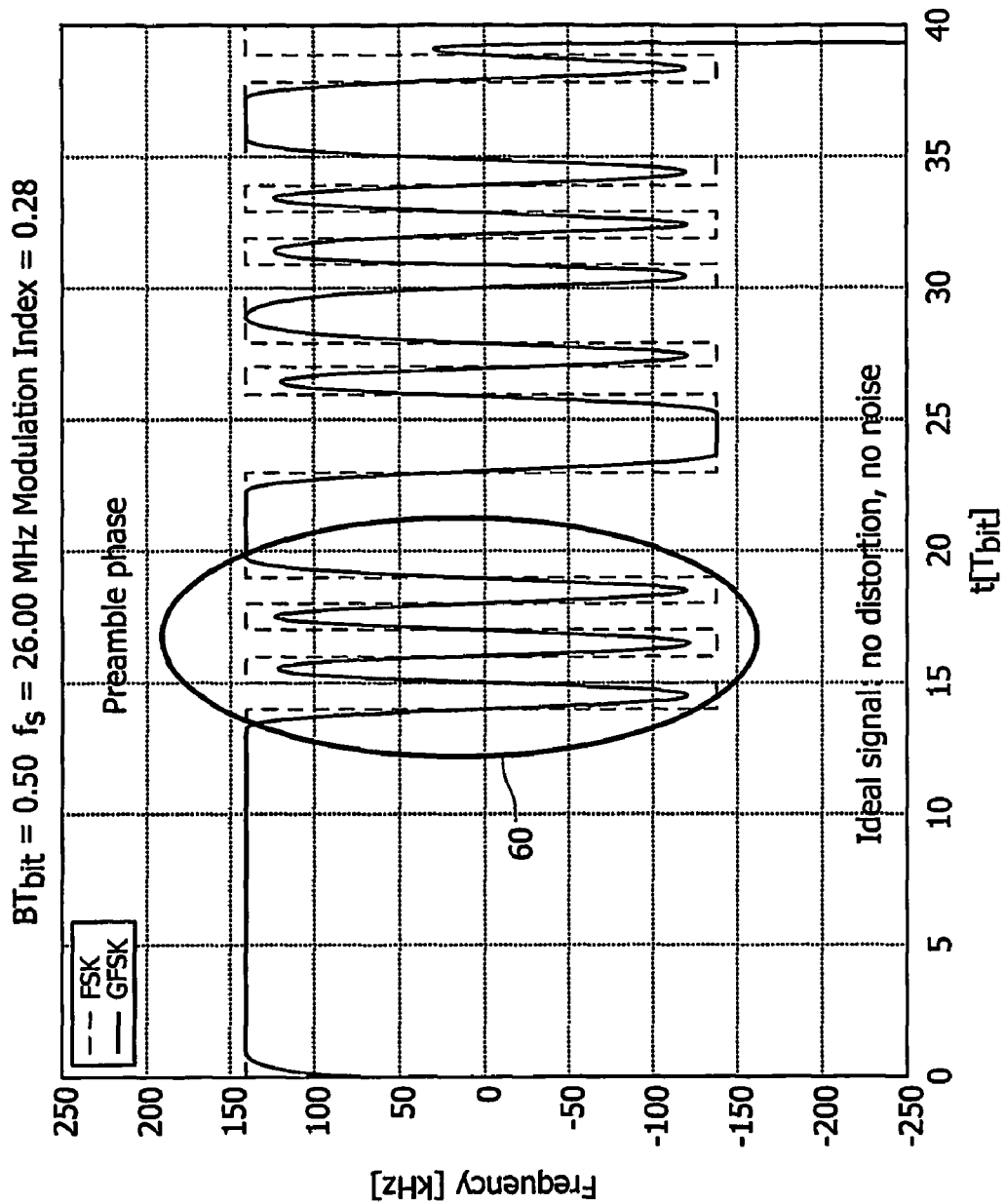
FIG. 6 is a schematic graph illustrating an FSK and a GFSK antenna signal with a Bluetooth preamble.

A simulated ideal antenna signal $V_{Antenna}$, that is a signal without noise and with no distortions, is illustrated in FIG. 6. The preamble phase is shown in the oval 60. An FSK signal (dashed curve) and a GFSK signal (solid curve) are shown in FIG. 6. The only difference between these two modulation schemes is that in case of GFSK, a Gaussian filter is employed to smoothen the signal to limit its spectral width. This is called pulse shaping.

Figure 7:
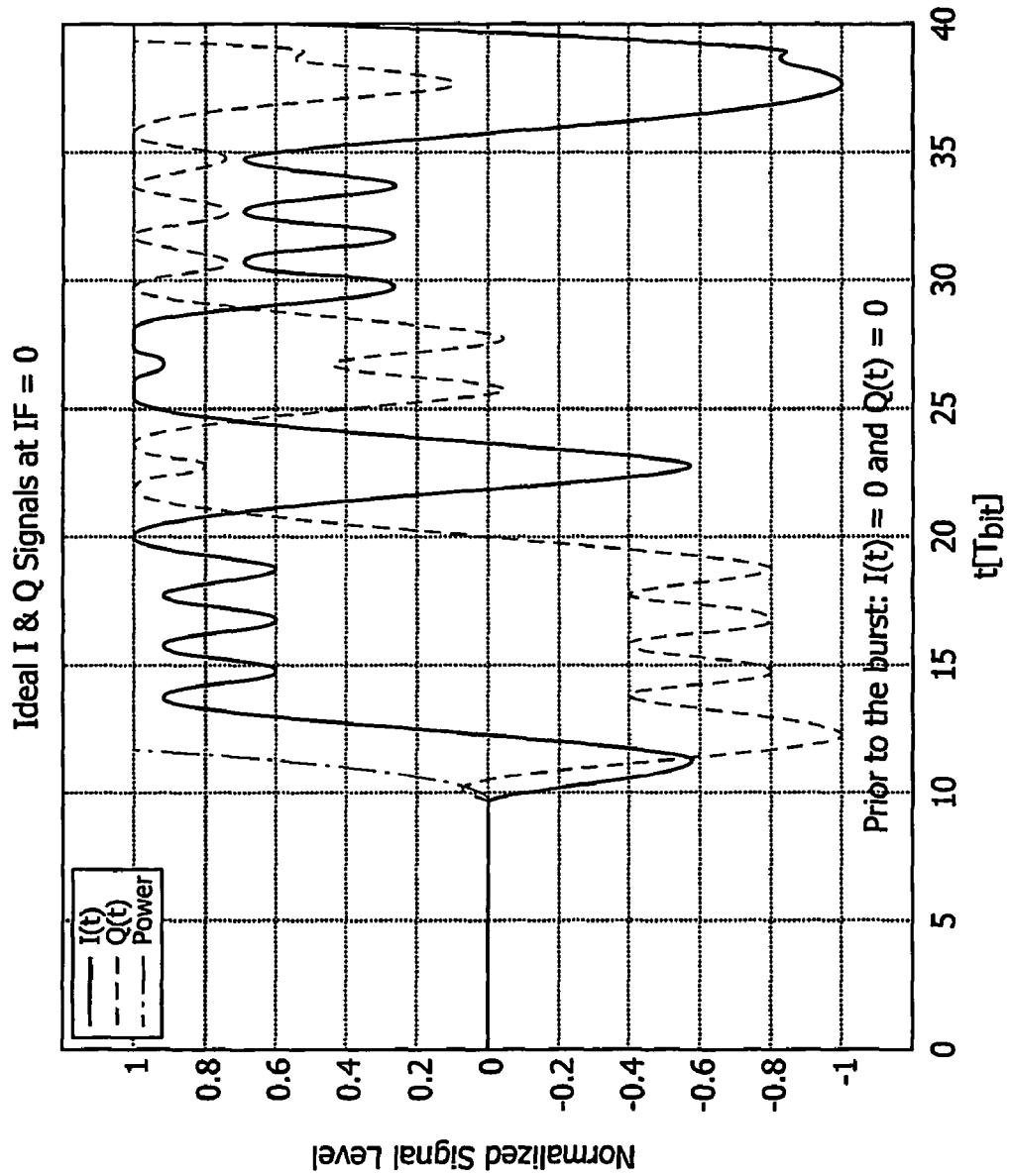
FIG. 7 is a schematic graph illustrating ideal I and Q signals of the GFSK antenna signal in FIG. 6.

In FIG. 7, the ideal I and Q signals for the signal in FIG. 6 are shown. Prior to the arrival of the signal burst, the signals $I_{MIX, OUT}$ and $Q_{MIX, OUT}$ are equal to zero. The I(t) signal is shown as solid curve and the Q(t) signal is shown as dashed curve. The power is also indicated as separate curve in FIG. 7.

Figure 8:
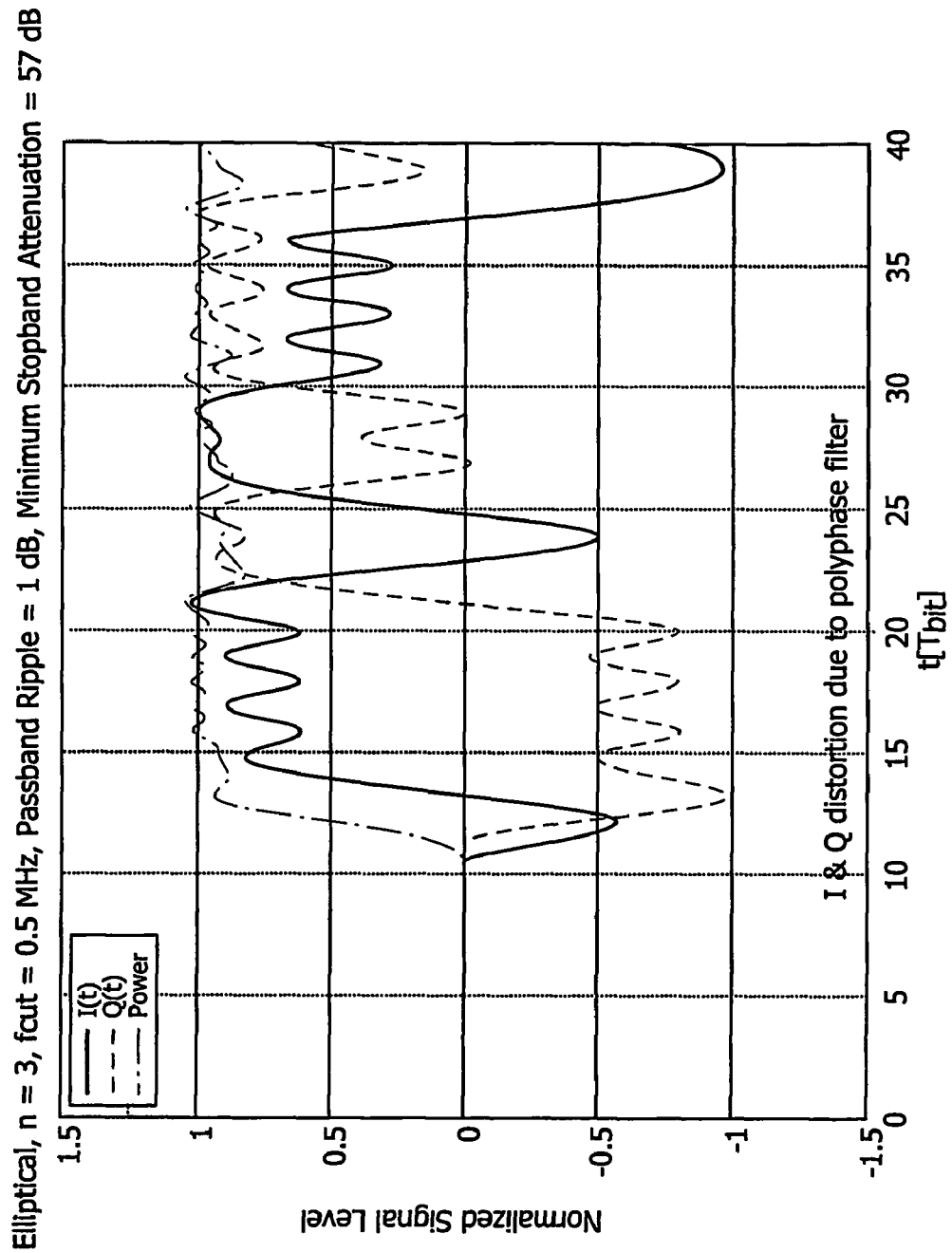
FIG. 8 is a schematic graph illustrating the distorted I and Q signals caused by a polyphase filter of the receiver.

In FIG. 8, the two band-limited I and Q signals are shown. The distortion due to the polyphase filter 15 is depicted in FIG. 8.

Figure 9:
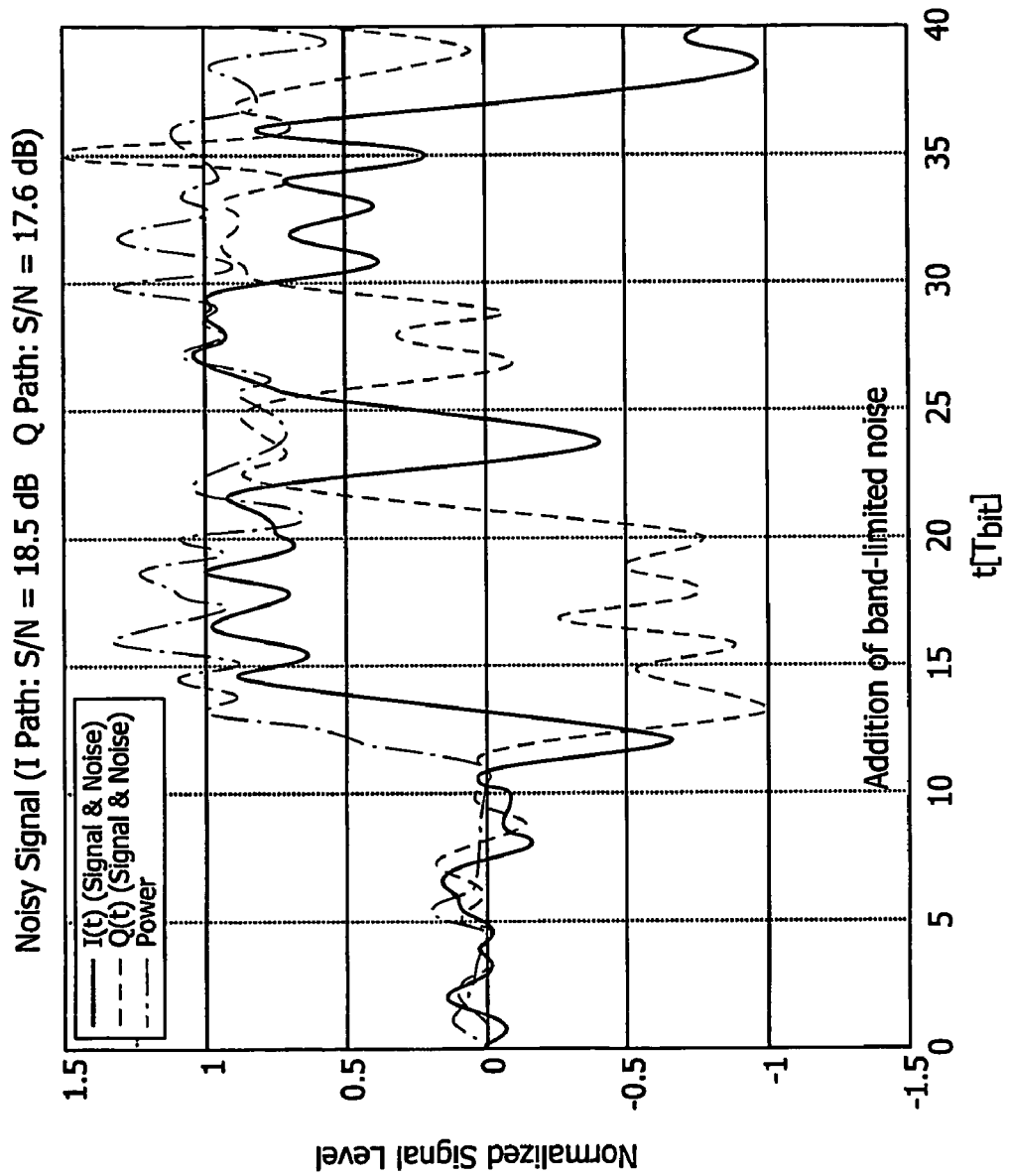
FIG. 9 is a schematic graph illustrating of the distorted I and Q with band-limited noise and a frequency offset of 150 kHz.

The two band-limited I and Q signals with band-limited noise are illustrated in FIG. 9.

Figure 10:
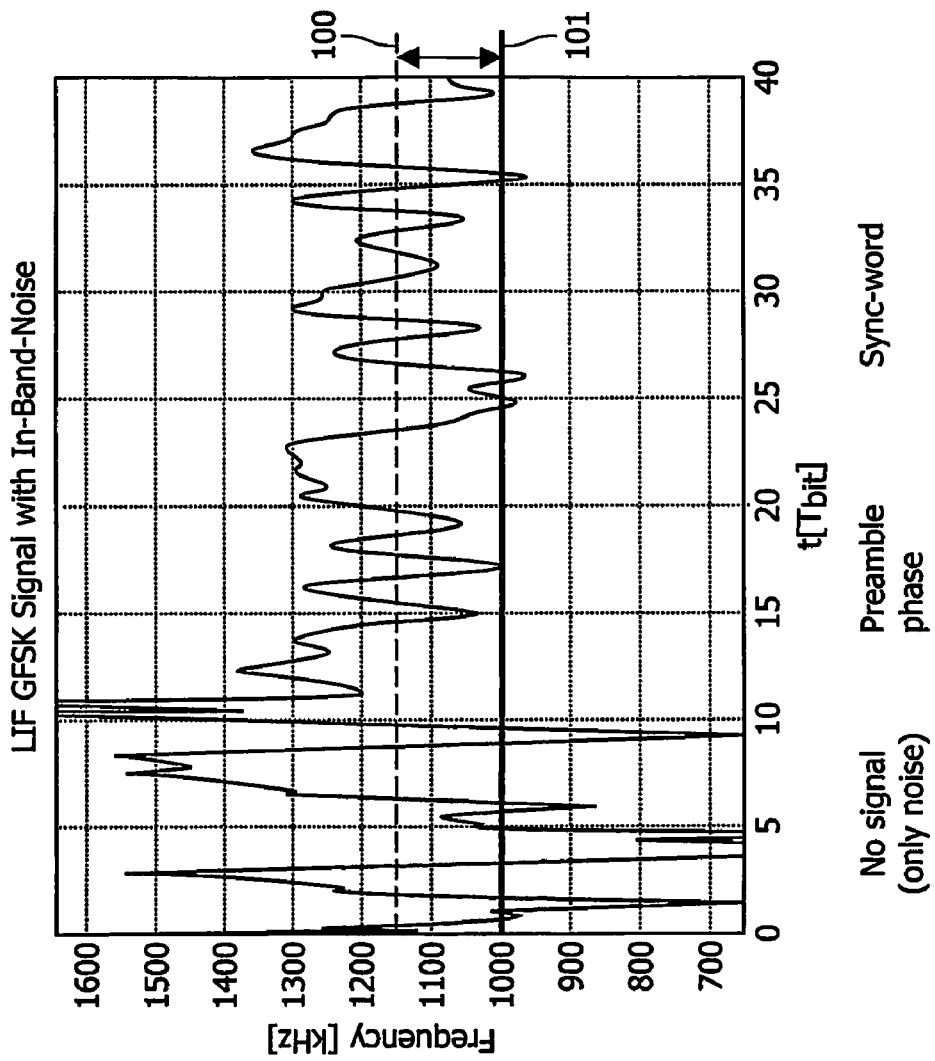
FIG. 10 is a schematic graph illustrating an LIF GFSK signal with band-limited noise.

A typical IF GFSK signal, as derived from an antenna signal $V_{Antenna}$, is illustrated in FIG. 10. This signal in the present example has a frequency offset of 150 kHz, as illustrated by the dashed horizontal line 100. The nominal center frequency IF is 1000 kHz, as illustrated by the solid horizontal line 101.

Figure 11:
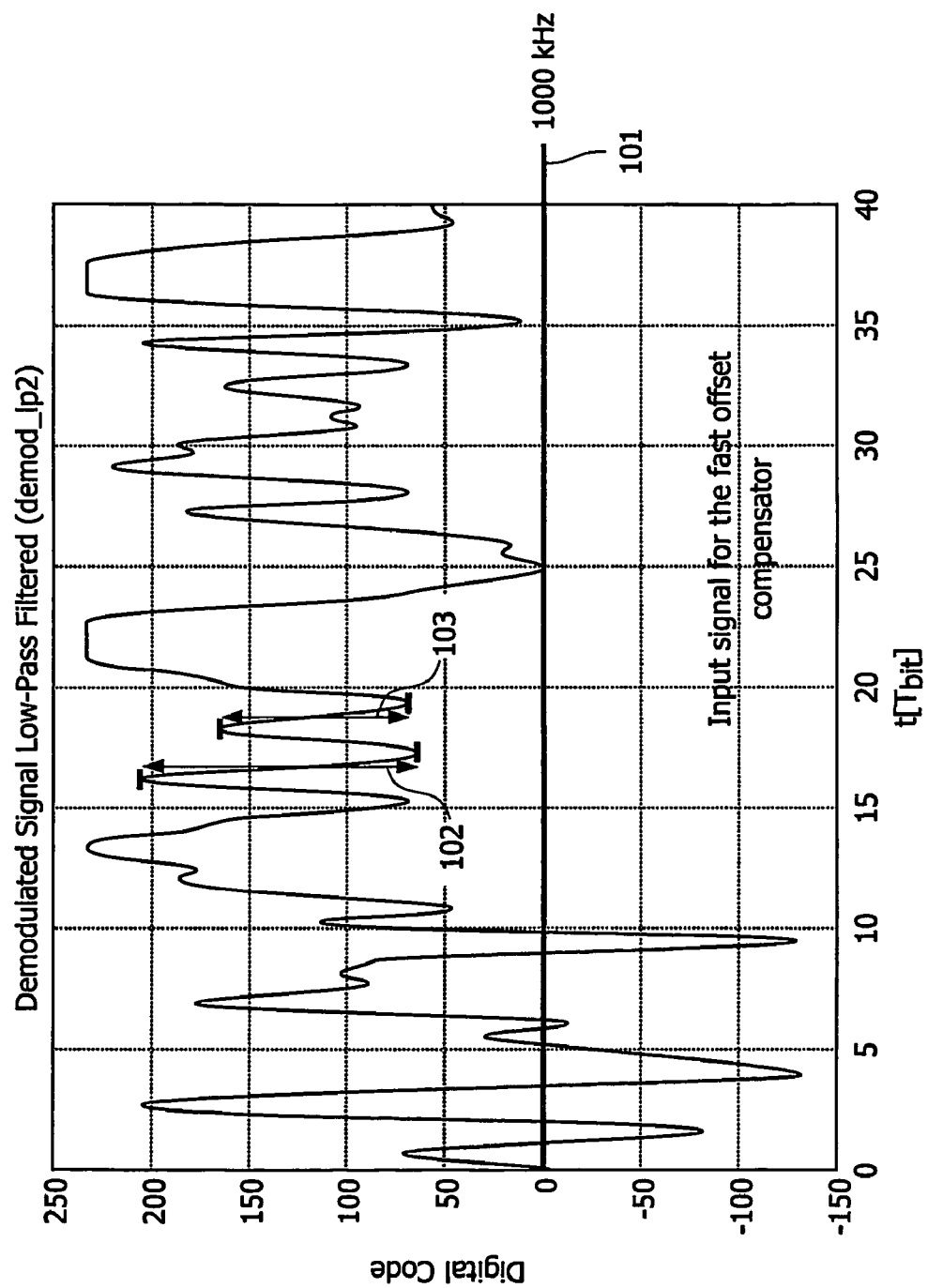
FIG. 11 is a schematic graph illustrating the input signal of the fast offset compensation unit, according to the present invention, this signal being hereinafter referred to as digitally coded frequency demodulated signal (demod_lp2)

In FIG. 11, the demodulated signal demod_lp2, after low pass filtering, is shown. This signal demod_lp2 serves as input signal of the digital apparatus, according to the present invention. The nominal center frequency IF is 1000 kHz, as illustrated by the horizontal line 101. The first difference 102 and the second difference 103 are determined between minimum-maximum pairs, as indicated.

Figure 12:
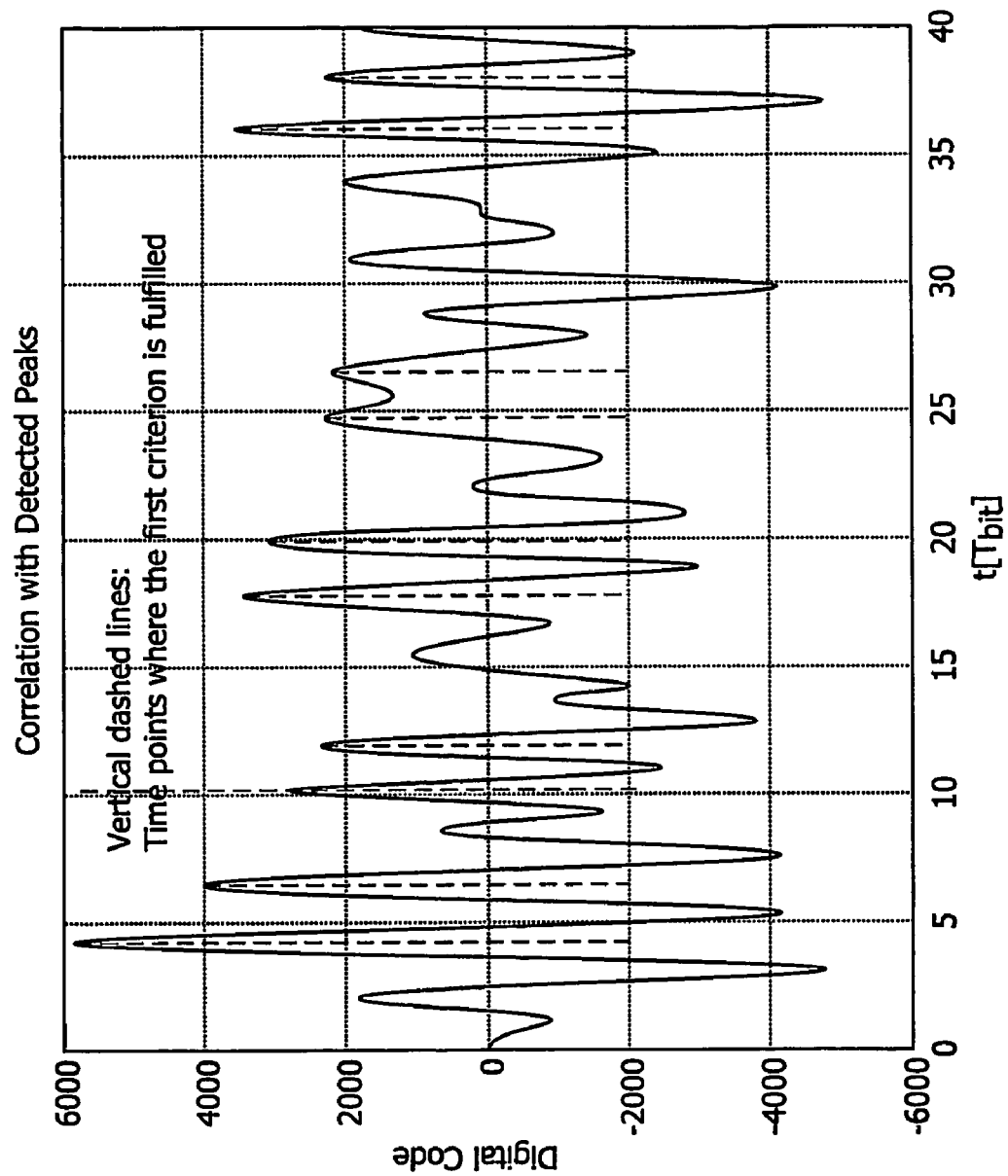
FIG. 12 is a schematic graph illustrating a correlation with detected peaks and points in time where the first criterion is fulfilled.

FIG. 12 indicates by means of vertical dashed lines those points in time where the first criterion—the so-called correlation criterion—is fulfilled. These points in time are singled out by means of the correlation with a sine wave, as described above. As becomes obvious from this FIG. 12, there are many potential candidates that seem to indicate the end of the preamble sequence. The correlation value is illustrated as solid line in FIG. 12.

Figure 13:
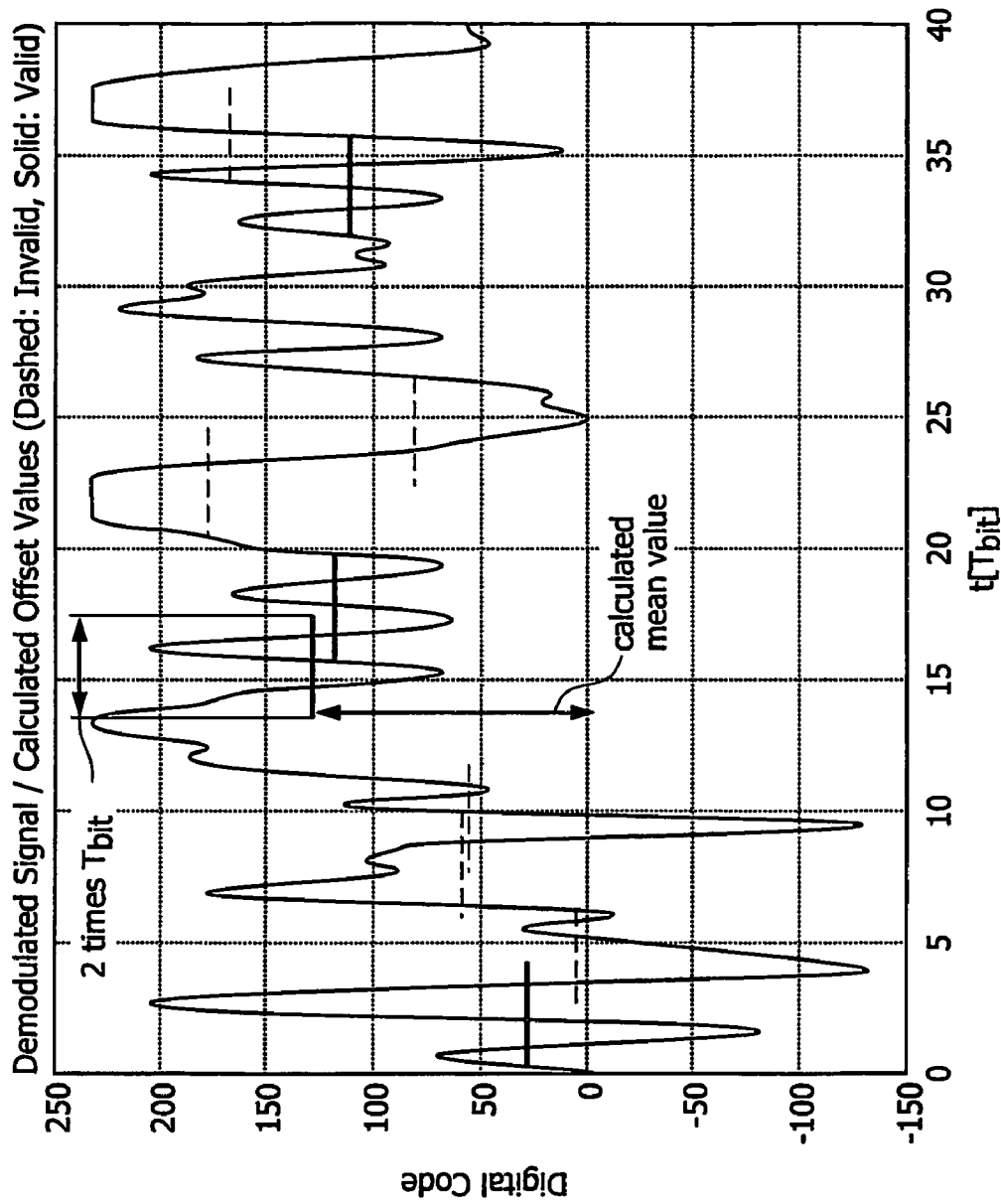
FIG. 13 is a schematic graph illustrating the digitally coded frequency demodulated signal (demod_lp2) and periods in time where the first criterion and the second criterion are fulfilled.

FIG. 13 is used to illustrate and explain the operation of the digital means 26 or 36 for minimum-maximum evaluation. The solid horizontal lines in FIG. 13 correspond to the time windows where the first criterion is fulfilled and sub_A and sub_B values (cf. FIG. 4) are greater than the threshold_2.

The dashed horizontal lines in FIG. 13 indicate invalid offset values which are sorted out since they do not fulfill the second criterion (minimum-maximum criterion).

Figure 14:
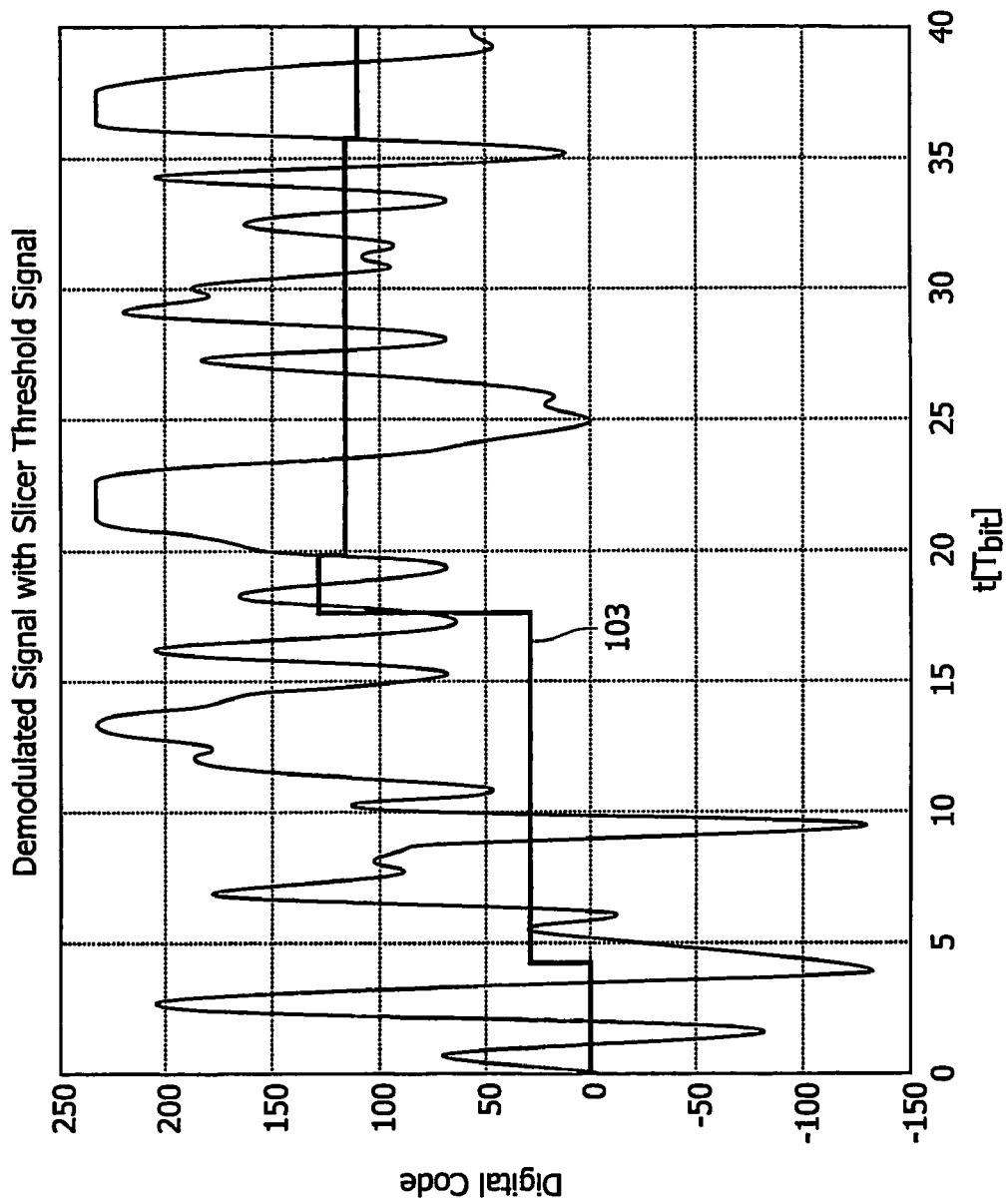
FIG. 14 is a schematic graph illustrating the digitally coded frequency demodulated signal (demod_lp2) and a slicer threshold signal.

In FIG. 14, the output of the offset register 37.2 is illustrated as solid line 103.

Apart of the main task of demodulating the symbols from the incoming GFSK modulated signal (antenna signal $V_{Antenna}$), some signal processing is necessary such as clock recovery and frequency offset compensation. If there is a mismatch between the reference frequencies of both communication partners, a frequency offset is generated resulting in a unwanted DC component in the demodulated signal demod_lp.

In order to reduce cost and power consumption, digital demodulators will be used in future Bluetooth systems. The main issue of the respective digitally-implemented receiver back-end is the fast frequency offset compensation using the known MaxMin algorithm. Sometimes, the calculated offset is very inaccurate (or totally wrong) resulting in a high package error rate. Since the preamble phase of only 4 symbols is very short, a very fast settling procedure for the receiver is required. In addition, the exact beginning of the preamble sequence is unknown and therefore the demodulated frequency signal (after activating the receiver part, but prior to the burst) generates a wrong initial value for the MaxMin algorithm. This error is caused by the noise signal (prior to the signal burst) containing huge frequency amplitudes. Even the use of the known leakage concept reducing the effect of the wrong initial value (after a certain time) did not satisfy the PER requirements.

The apparatus for frequency offset compensation, according to the present invention, is very well suited for being used in connection with a digital demodulator, like the one being illustrated in FIGS. 1 and 2. The invention proposed here allows to determine a rough offset in a very short time using the frequency demodulated signal without the accurate knowledge of the beginning of the signal burst. The simple chosen receiver architecture (cf. FIGS. 1 and 2), using comparators instead of ADCs to convert the analog I and Q signals to the digital domain, extracts the frequency information from the antenna signal.

As described above, the proposed digital apparatus for the fast offset compensation is based on a correlator. If in the antenna signal a sequence of "1010" occurs—corresponding to the Bluetooth preamble phase—an offset value is immediately calculated and subtracted from the signal. In order to increase the reliability of the right detection two criteria, as described above, have to be fulfilled. Apart from a minimum correlation value, the peaks of the positive and negative half-waves have to have a certain distance. Every time both criteria are fulfilled (i.e. the circuit has detected the corresponding sequence), the offset error is newly calculated and subtracted.

It is another advantage of the present invention that the knowledge about the actual location of the preamble phase also allows to improve the clock recovery of the receiver. Once the preamble has been detected using a digital apparatus, according to the present invention, a coarse phase information of the incoming received signal is available which can be used for initializing a digital phase locked loop (DPLL).

The present invention can be applied for all communication standards using frequency shift keying (FSK) modulation schemes such as DECT, Pager and Bluetooth standards. However, the speed requirement for the offset calculation in a DECT application, for example, is relaxed compared to Bluetooth due to the longer preamble phase (DECT has 16 preamble symbols) and therefore a simpler methodology might be applied where just the correlation criterion is examined. In a DECT implementation of the invention, it may not be necessary to apply the minimum-maximum criterion in addition to the correlation criterion.

The present invention can be used in mobile phones and other mobile devices, for example.

In the drawings and specification there has been set forth preferred embodiments of the invention and, although specific terms are used, the description thus given uses terminology in a generic and descriptive sense only and not for purposes of limitation.

The invention claimed is:

1. Apparatus for determining a frequency offset error, comprising an input for receiving a digitally coded frequency demodulated signal, said frequency demodulated signal being processed by
   digital means for performing a correlation in order to determine whether a correlation criterion is fulfilled,
   digital means for performing a minimum-maximum evaluation in order to determine whether a minimum-maximum criterion are fulfilled, and
   digital processing means for calculating a current offset of the frequency demodulated signal and to cancel the current offset if both criteria are fulfilled, wherein the digital means for performing the minimum-maximum evaluation determines whether expected peaks of positive and negative half-waves of the frequency demodulated signal have predefined distances.

2. The apparatus of claim 1, wherein the digital means for performing a correlation comprise a correlator, a peak detector and a comparator.

3. The apparatus of claim 1, wherein the digital means for performing a minimum-maximum evaluation comprise two subtractors and two comparators.

4. The apparatus of claim 1, wherein the digital processing means comprise an average detector, an offset register, and an offset compensator to subtract the current offset stored in the offset register from the frequency demodulated signal.

5. The apparatus of claim 1, wherein the digital means for performing a correlation and the digital means for performing a minimum-maximum evaluation both provide signals to the digital processing means in order to cause the digital processing means to cancel the current offset.

6. The apparatus of claim 1, comprising two comparators serving as limiters followed by building blocks arranged to extract said frequency demodulated signal from a frequency shift keyed modulated signal.

7. The apparatus of claim 1 wherein the digital means for performing a correlation correlates the frequency demodulated signal with a time-limited sine wave signal, and determines whether the result of this correlation exceeds a certain threshold.

8. The apparatus of claim 1, wherein the digital means for performing a correlation provides an output signal indicating that the criterion for a known sequence is fulfilled.

9. The apparatus of claim 1, wherein the digital means for performing a minimum-maximum evaluation calculates two subtractions in order to compare four received symbols with corresponding amplitudes.

10. The apparatus according to claim 1, wherein the frequency demodulated signal is a digital coded signal.

11. The apparatus of claim 4, wherein the offset compensator is employed in order to continuously subtract a value stored in the offset register from the frequency demodulated signal.

12. The apparatus of claim 4, wherein the average detector is a sliding average detector that continuously generates a mean value of the frequency demodulated signal.

13. A receiver comprising:
   an apparatus for determining a frequency offset error, the apparatus including:
      an input for receiving a digitally coded frequency demodulated signal, said frequency demodulated signal being processed by,
         digital means for performing a correlation in order to determine whether a correlation criterion is fulfilled, and
         digital means for performing a minimum-maximum evaluation in order to determine whether a minimum-maximum criterion are fulfilled, said apparatus further comprising digital processing means to calculate the current offset of the frequency demodulated signal and to cancel the current offset if both criteria are fulfilled, wherein the digital means for performing the minimum-maximum evaluation determines whether expected peaks of positive and negative half-waves of the frequency demodulated signal have predefined distances.

14. The receiver of claim 13, comprising an analog front-end and a digital back-end, said apparatus for determining a frequency offset error being part of said digital back-end.

15. The receiver of claim 13 being designed to receive and process FSK or GFSK modulated antenna signals.

16. Apparatus for determining a frequency offset error, comprising an input for receiving a digitally coded frequency demodulated signal, said frequency demodulated signal being processed by
   digital means for performing a correlation in order to determine whether a correlation criterion is fulfilled, wherein the digital means for performing a correlation comprise a correlator, a peak detector and a comparator,
   digital means for performing a minimum-maximum evaluation in order to determine whether a minimum-maximum criterion are fulfilled, and
   digital processing means for calculating a current offset of the frequency demodulated signal and to cancel the current offset if both criteria are fulfilled.

17. The apparatus of claim 16 wherein the digital means for performing a minimum-maximum evaluation comprise two subtractors and two comparators.

18. The apparatus of claim 16 wherein the digital means for performing a minimum-maximum evaluation calculates two subtractions in order to compare four received symbols with corresponding amplitudes.

19. Apparatus for determining a frequency offset error, comprising an input for receiving a digitally coded frequency demodulated signal, said frequency demodulated signal being processed by
   digital means for performing a correlation in order to determine whether a correlation criterion is fulfilled,
   digital means for performing a minimum-maximum evaluation in order to determine whether a minimum-maximum criterion are fulfilled, wherein the digital means for performing a minimum-maximum evaluation comprise two subtractors and two comparator, and
   digital processing means for calculating a current offset of the frequency demodulated signal and to cancel the current offset if both criteria are fulfilled.

20. The apparatus of claim 19 wherein the digital processing means comprise an average detector, an offset register, and an offset compensator to subtract the current offset stored in the offset register from the frequency demodulated signal.

21. The apparatus of claim 19 wherein the digital means for performing a minimum-maximum evaluation calculates two subtractions in order to compare four received symbols with corresponding amplitudes.

22. Apparatus for determining a frequency offset error, comprising an input for receiving a digitally coded frequency demodulated signal, said frequency demodulated signal being processed by
 digital means for performing a correlation in order to determine whether a correlation criterion is fulfilled,
 digital means for performing a minimum-maximum evaluation in order to determine whether a minimum-maximum criterion are fulfilled, and
 digital processing means for calculating a current offset of the frequency demodulated signal and to cancel the current offset if both criteria are fulfilled, wherein the digital processing means comprise an average detector, an offset register, and an offset compensator to subtract the current offset stored in the offset register from the frequency demodulated signal.

23. The apparatus of claim 22 wherein the digital means for performing a correlation correlates the frequency demodulated signal with a time-limited sine wave signal, and determines whether the result of this correlation exceeds a certain threshold.

24. The apparatus of claim 22, wherein the frequency demodulated signal is a digital coded signal.

25. The apparatus of claim 22, wherein the offset compensator is employed in order to continuously subtract a value stored in the offset register from the frequency demodulated signal.

26. The apparatus of claim 22, wherein the average detector is a sliding average detector that continuously generates a mean value of the frequency demodulated signal.

27. Apparatus for determining a frequency offset error, comprising an input for receiving a digitally coded frequency demodulated signal, said frequency demodulated signal being processed by
 digital means for performing a correlation in order to determine whether a correlation criterion is fulfilled,
 digital means for performing a minimum-maximum evaluation in order to determine whether a minimum-maximum criterion are fulfilled,
 digital processing means for calculating the current offset of the frequency demodulated signal and to cancel the current offset if both criteria are fulfilled, and
 two comparators serving as limiters followed by building blocks arranged to extract said frequency demodulated signal from a frequency shift keyed modulated signal.

28. The apparatus of claim 27 wherein the digital means for performing a correlation correlates the frequency demodulated signal with a time-limited sine wave signal, and determines whether the result of this correlation exceeds a certain threshold.

29. The apparatus of claim 27 wherein the digital means for performing a correlation provides an output signal indicating that the criterion for a known sequence is fulfilled.

30. Apparatus for determining a frequency offset error, comprising an input for receiving a digitally coded frequency demodulated signal, said frequency demodulated signal being processed by
 digital means for performing a correlation in order to determine whether a correlation criterion is fulfilled,
 digital means for performing a minimum-maximum evaluation in order to determine whether a minimum-maximum criterion are fulfilled,
 digital processing means for calculating the current offset of the frequency demodulated signal and to cancel the current offset if both criteria are fulfilled, and
 wherein the digital means for performing a correlation correlates the frequency demodulated signal with a time-limited sine wave signal, and determines whether the result of this correlation exceeds a certain threshold.

31. The apparatus of claim 30 wherein the digital means for performing a correlation and the digital means for performing a minimum-maximum evaluation both provide signals to the digital processing means in order to cause the digital processing means to cancel the current offset.

32. The apparatus of claim 30 wherein the frequency demodulated signal is a digital coded signal.

33. The apparatus of claim 16
 wherein the digital means for performing a correlation provides an output signal indicating that the criterion for a known sequence is fulfilled.

34. The apparatus of claim 16 wherein the digital means for performing a correlation and the digital means for performing a minimum-maximum evaluation both provide signals to the digital processing means in order to cause the digital processing means to cancel the current offset.

35. The apparatus of claim 30 wherein the digital means for performing a correlation comprise a correlator, a peak detector and a comparator.

36. Apparatus for determining a frequency offset error, comprising an input for receiving a digitally coded frequency demodulated signal, said frequency demodulated signal being processed by
 digital means for performing a correlation in order to determine whether a correlation criterion is fulfilled,
 digital means for performing a minimum-maximum evaluation in order to determine whether a minimum-maximum criterion are fulfilled,
 digital processing means for calculating the current offset of the frequency demodulated signal and to cancel the current offset if both criteria are fulfilled, and
 wherein the digital means for performing a minimum-maximum evaluation calculates two subtractions in order to compare four received symbols with corresponding amplitudes.

37. The apparatus of claim 36 wherein the frequency demodulated signal is a digital coded signal.

38. The apparatus of claim 36 comprising two comparators serving as limiters followed by building blocks arranged to extract said frequency demodulated signal from a frequency shift keyed modulated signal.

39. The apparatus of claim 30
 wherein the frequency demodulated signal is a digital coded signal.

40. The apparatus of claim 19 wherein the digital means for performing a correlation and the digital means for performing a minimum-maximum evaluation both provide signals to the digital processing means in order to cause the digital processing means to cancel the current offset.

41. The apparatus of claim 27 wherein the digital means for performing a correlation correlates the frequency demodulated signal with a time-limited sine wave signal, and determines whether the result of this correlation exceeds a certain threshold.

* * * * *